(12) United States Patent
Menendez (10) Patent No.: US 8,406,423 B2
(45) Date of Patent: Mar. 26, 2013

(54) MULTI-BIT CRYPTOGRAPHICALLY SECURE ENCRYPTOR FOR M-ARY SPECTRAL PHASE ENCODER OPTICAL CODE DIVISION MULTIPLE ACCESS

(75) Inventor: Ronald Charles Menendez, Chatham, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 238 days.

(21) Appl. No.: 12/724,617

(22) Filed: Mar. 16, 2010

(65) Prior Publication Data

US 2011/0228938 A1 Sep. 22, 2011

(51) Int. Cl.
*H04K 9/28* (2006.01)
(52) U.S. Cl. .......................... 380/28; 398/201
(58) Field of Classification Search .......... 380/28, 380/255, 256, 219, 42, 43; 398/77–79, 43–45, 398/40, 140, 168, 182, 201–202, 212
See application file for complete search history.

(56) References Cited

U.S. PATENT DOCUMENTS

| 6,201,870 | B1 * | 3/2001 | Medard et al. ............. 380/46 |
| 6,493,376 | B1 * | 12/2002 | Harms et al. ............. 375/130 |
| 7,620,328 | B2 * | 11/2009 | Toliver ............. 398/188 |
| 7,831,049 | B1 * | 11/2010 | Kanter ............. 380/256 |
| 2004/0032954 | A1 * | 2/2004 | Bonfrate et al. ............. 380/263 |
| 2005/0036618 | A1 * | 2/2005 | Gammel et al. ............. 380/255 |
| 2007/0036553 | A1 * | 2/2007 | Etemad et al. ............. 398/140 |
| 2007/0280697 | A1 | 12/2007 | Menendez |
| 2010/0003031 | A1 * | 1/2010 | Menendez ............. 398/78 |
| 2010/0183309 | A1 | 7/2010 | Etemad et al. |

FOREIGN PATENT DOCUMENTS

| WO | 2009148641 A1 | 12/2009 |
| WO | WO 2009148641 A1 * | 12/2009 |

OTHER PUBLICATIONS

R. Menendez, A. Agarwal, P. Toliver, J. Jackel, S. Etemad, "Direct Optical Processing of M-ary Code-Shift Keyed OCDMA Using Integrated Passive Optical Phase Decoders," Optical Communications ECOC 2006 European Conference, Cannes, France, pp. 1-2, Sep. 2006.
R. Menendez, A. Agarwal, P. Toliver, J. Jackel, and S. Etemad, "Direct Optical Processing of M-ary Code-Shift Keyed Spectral Phase Encoded OCDMA," Journal of Optical Networking, vol. 6, Issue 5, pp. 442-450, 2007.
International Application No. PCT/US2011/046577—PCT International Search Report dated Nov. 11, 2011.

\* cited by examiner

*Primary Examiner* — Philip Chea
*Assistant Examiner* — Eric W Shepperd
(74) *Attorney, Agent, or Firm* — Philip J. Feig (57) ABSTRACT

A system and methods are provided for transmitting an encrypted data word of two or more bits. This involves identifying a random key word comprising two or more bits for encrypting the data word and identifying a set of unique orthogonal codes. This also involves selecting a code from the set of unique orthogonal codes that corresponds to a result of an exclusive-or (XOR) operation between the two or more bits of the data word and the random key word. This also involves encoding a signal with the code and transmitting the encoded signal as encrypted data.

28 Claims, 7 Drawing Sheets

|  202 | H1 | H2 | H3 | H4 | 204 |
|---|---|---|---|---|---|
| H1 | H1 | H2 | H3 | H4 | |
| H2 | H2 | H1 | H4 | H3 | 206 |
| H3 | H3 | H4 | H1 | H2 | |
| H4 | H4 | H3 | H2 | H1 | |

TRADITIONAL CODE TRANSLATION TABLE
FOR ORDER N=4 HADAMARD CODES

200 TABLE

FIG. 2B

|    | 00 | 01 | 10 | 11 |
|----|----|----|----|----|
| 00 | 00 | 01 | 10 | 11 |
| 01 | 01 | 00 | 11 | 10 |
| 10 | 10 | 11 | 00 | 01 |
| 11 | 11 | 10 | 01 | 00 |

208 TABLE

MULTI-BIT CRYPTOGRAPHICALLY SECURE ENCRYPTOR FOR M-ARY SPECTRAL PHASE ENCODER OPTICAL CODE DIVISION MULTIPLE ACCESS

STATEMENT REGARDING FEDERALLY SPONSORED RESEARCH

Funding for research was partially provided by the Defense Advanced Research Projects Agency under federal contract MDA972-03-C-0078. The federal government has certain rights in this invention.

BACKGROUND

1. Technical Field

The present invention relates to signal processing and data encryption. In particular, the disclosed embodiments relate to communicating an encrypted data word via an optical code division multiplexed (OCDM) signal.

2. Description of the Related Art

Spectral phase encoding (SPE) involves selectively changing the phases of the frequency lines in an optical pulse according to a particular code. For example, if an optical pulse has frequency lines $\{f_1, \ldots f_n\}$, then the frequency lines may be coded by a code $\{c_1, \ldots c_m\}$. An element in the code corresponds to a frequency line, and may shift the phase of the frequency line according to a value of the element. Different codes cause different shifts in the frequency lines.

Different codes may also map to different transmission data. For example, a code A (representing a series of frequency line phase shifts) may represent a data bit of 0 for transmission and a second code B (representing a different series of frequency line phase shifts) may represent a data bit of 1 for transmission. Thus, an optical pulse encoded with code A may carry a value of 0 and an optical pulse encoded with code B may carry a value of 1. It is assumed that a receiver knows the mapping between codes and transmission data, and therefore can extract the transmission data for each received coded optical pulse. This use of different codes to transmit data, rather than modulating the amplitude or phase of the optical pulses, is generally known as code-shift keying (CSK) modulation.

The encoded signal, however, may be intercepted by a third party, who may read the encoded optical pulse and determine whether code A or code B was used for encoding. After intercepting enough signals, it would be trivial for the third party to determine that code A corresponds to 0 and code B corresponds to 1.

Figure 1:
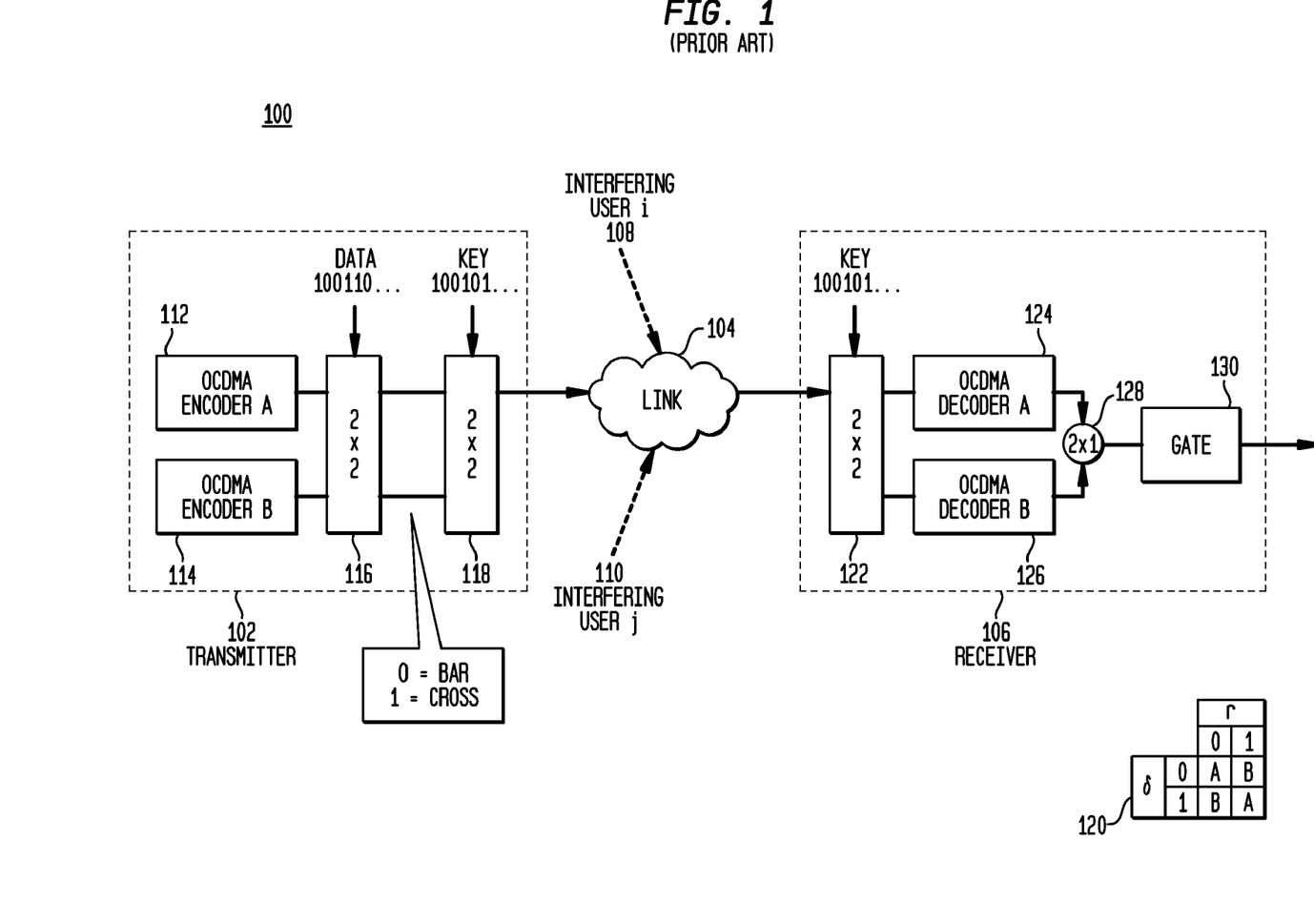
FIG. 1 illustrates a prior-art system for encoding an optical pulse with one of two codes to encrypt a data bit.

Researchers at Princeton University devised a system for encoding an optical pulse with one of a pair of codes that would not reveal the corresponding data bit to an intercepting third party. FIG. 1 illustrates this system.

FIG. 1 illustrates a system 100 for encoding an optical pulse with one or the other of a pair of codes to carry a single bit of data. System 100 includes transmitter 102 for encoding and transmitting an optical pulse over link 104 and receiver 106 for receiving and decoding the optical pulse. System 100 also includes interfering user i 108 and interfering user j 110 that have access to link 104.

Transmitter 102 includes Optical Code Division Multiple Access (OCDMA) encoder A 112 and OCDMA encoder B 114. The OCDMA encoders operate by giving physical delays to different wavelength components in an optical signals, and are not spectral phase encoders. OCDMA encoder A 112 and OCDMA encoder B 114 both receive optical pulses from a laser (not shown). OCDMA encoder A 112 encodes the optical pulses with a code A, while OCDMA encoder B 114 encodes the optical pulses with a code B. Instead of transmitting code A to represent a 1 and code B to represent a 0, transmitter 102 encrypts the codes according to a random key bit. The key bit may be randomly generated or pseudo-randomly generated with equal probability of being 1 or 0. Thus, the code used to encode an optical pulse is determined both according to the data bit and the key bit, as shown below.

Transmitter 102 also includes switches 116 and 118, both 2×2 switches with two inputs and two outputs. Switch 116 is controlled by a data bit from a plurality of data bits for transmission, while switch 118 is controlled by a random key bit from a plurality of random key bits for encrypting. In general, a value of 0 controls a switch to enter into a "bar" state, in which the upper input is switched to the upper output and the lower input is switched to the lower output. Moreover, a value of 1 controls a switch to enter into a "cross" state, in which the upper input is switched to the lower output and the lower input is switched to the upper output.

Switches 116 and 118 collectively perform an exclusive-or (XOR) operation between a single data bit and a single key bit to select a code. For example, if the data bit is 1 and the key bit is 1, then (1 XOR 1)=0, and code A corresponding to 0 is selected for transmission. This is implemented by switches 116 and 118 as follows. Data bit 1 causes switch 116 to enter into a cross state, so that a code A signal (outputted from OCDMA encoder A 112) is switched to a lower output of switch 116, and that a code B signal (outputting from OCDMA encoder B 114) is switched to a upper output of switch 116. Code A and B signals reach switch 118, which is controlled to enter into a cross state by key bit 1. Thus, the code A signal A is switched from the lower input of switch 118 to the upper output, and code B signal B is switched from the upper input of switch 118 to the lower output. Switch 118 drops its lower output and sends its upper output (i.e., the code A signal) onward via link 104. Thus, switches 116 and 118 perform an XOR operation of data bit 1 and key bit 1 by selecting code A.

The use of data bit 1 and key bit 1 is exemplary only. Indeed, table 120 illustrates the resulting code transmissions arising from the four different combinations of data bits (d) and random key bits (r).

In this example, an optical pulse encoded with code A travels over link 104 where it may be combined with signals from other users sharing link 104, such as interfering user i 108 and/or interfering user j 110. The interfering users use different codes from A and B in their signals. More importantly, interfering user i 108 and interfering user j 110 (and any eavesdroppers on the system) will also receive a copy of the combined signals on link 104 from all other users. This makes eavesdropping an issue. However, even if interfering user i 108 and interfering user j 110 determine that the optical pulse is encoded with code A, it is impossible to associate a data bit with code A without knowledge of the corresponding random key bit. Indeed, because code A was selected by XORing the data word with a random key word, there is an equal likelihood that code A corresponds to either a 1 or a 0.

The optical pulse encoded with code A (combined with other signals from other users) travels to receiver 106, which includes another 2×2 switch, switch 122. Switch 122 is controlled by the same key bit used to encode the optical signal at transmitter 102. That is to say, the receiver has to have knowledge of the random key bit string generated at the transmitter. In this sense, this system corresponds to a one-time pad in which both the transmitter and receiver share a random key string that is unknown to potential eavesdroppers. The key bit at receiver 106 undoes the XOR at transmitter 102, so that receiver 106 can correctly recover the data bit. In particular, switch 122 is controlled to enter the cross state by key bit 1. This causes the upper input of switch 122 to be switched to the lower output of switch 122.

Receiver 106 also includes OCDMA decoder A 124 and OCDMA decoder B 126. OCDMA decoder A 124 outputs a positive signal (i.e., a large optical pulse) if its input signal is an optical pulse encoded with code A, and outputs a null signal (i.e., no large optical pulse) if its input signal is an optical pulse encoded with another code, such as code B. Similarly, OCDMA decoder B 126 outputs a positive signal if its input signal is an optical pulse encoded with code B, and outputs a null signal if its input signal is an optical pulse encoded with another code, such as code A. The outputs of OCDMA decoder A 124 and OCDMA decoder B 126 feed into 2×1 coupler 128, which combines the outputs into a single signal, and feeds the single signal to gate 130. Gate 130 determines whether the signal corresponds to a data bit of 0 or 1.

In this example, switch 122 switches a code A signal, arriving at its upper input, to its lower output and to OCDMA decoder B 126. OCDMA decoder B 126 then outputs a null signal upon processing code A signal. Switch 122 further switches its lower input, which is empty, to its upper output, which is connected to OCDMA decoder A 124. OCDMA decoder A 124 outputs nothing because it receives no input signal. Thus, coupler 128 couples nothing from OCDMA decoder A 124 with a null signal from OCDMA decoder B 126, and outputs the null signal to gate 130. Gate 130 maps a null signal to a data bit of 1 and a positive signal to a data bit of 0. Because gate 130 receives a null signal in this example, it determines that the data bit is 1. In this way, system 100 encodes an optical pulse with a code to represent a data bit, using a random key, such that only a receiver with the random key can determine the value of the data bit.

A drawback of system 100 is that a single encoded optical pulse from the laser is limited to representing a single bit. It may be desirable for a single encoded optical pulse to represent multiple bits, such as a data word, in order to increase throughput.

SUMMARY

In accordance with the disclosed embodiments, there is provided a method for transmitting an encrypted data word of two or more bits, the method comprising the steps of: identifying a random key word comprising two or more bits for encrypting the data word; identifying a set of unique orthogonal codes; selecting a code from the set of unique orthogonal codes that corresponds to a result of an XOR operation between the two or more bits of the data word and the random key word; encoding a signal with the code; and transmitting the encoded signal as encrypted data.

In accordance with the disclosed embodiments, there is further provided a method for receiving an encrypted data word of two or more bits from a transmitter, the method comprising the steps of: identifying a set of unique orthogonal codes; identifying a random key word comprising two or more bits for decrypting a data word; receiving a signal encoded by a first code of the set of unique orthogonal codes that corresponds to a result of an XOR operation between the two or more bits of the data word and the random key word; and selecting a second code, from the set of unique orthogonal codes, on the basis of the two or more bits of the random key word, the second code corresponding to the two or more bits of the data word.

In accordance with the disclosed embodiments, there is further provided a system with a transmitter and a receiver for communicating an encrypted data word of two or more bits, wherein the transmitter is configured to: identify a random key word comprising two or more bits for encrypting the data word; identify a set of unique orthogonal codes; select a first code from the set of unique orthogonal codes that corresponds to a result of an XOR operation between the two or more bits of the data word and the random key word; encode a signal with the first code; and transmit the encoded signal as encrypted data; and the receiver is configured to: receive the signal encoded by the first code; and select a second code, from the set of unique orthogonal codes, on the basis of the two or more bits of the random key word, the second code corresponding to the two or more bits of the data word.

It is important to understand that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented here. While the techniques and embodiments will primarily be described in the context of the accompanying drawings, those skilled in the art will further appreciate that the techniques and embodiments can also be practiced in other electronic devices or systems.

Reference will now be made in detail to exemplary embodiments of the present invention, examples of which are illustrated in the accompanying drawings. Whenever possible, the same reference numbers will be used throughout the drawings to refer to the same or like parts.

As disclosed herein, the term "random" may refer to data that is randomly generated. For example, "random" may refer to a bit that has an equal likelihood of being a 1 or 0. As is known to one of ordinary skill in the art, in implementation, it may be difficult to generate data that is truly random. For example, when a "random" bit is generated in practice, it may be slightly more likely to be a 0 than a 1, or vice versa. This is due to practical constraints of random number generators. Accordingly, as disclosed herein, "random" may refer to data that is pseudo-randomly generated. Therefore, the term "random" may refer to data that is truly randomly generated and/or may refer to data that pseudo-randomly generated.

Figure 2A:
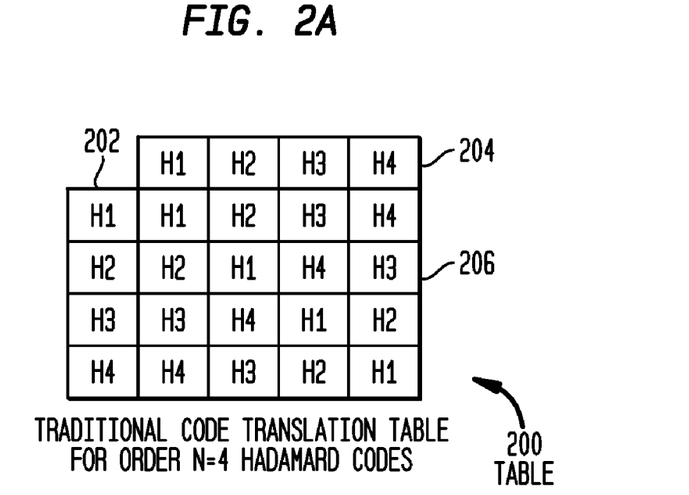
FIGS. 2A and 2B illustrate properties of Hadamard codes, which may be used in the disclosed embodiments.
Figure 2B:
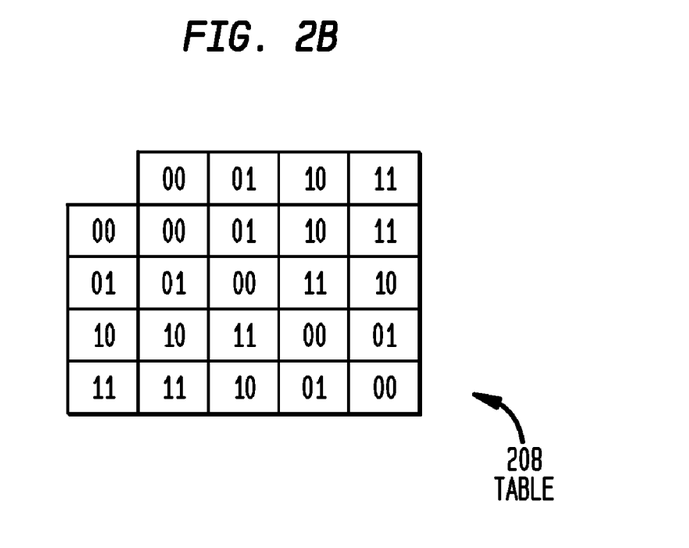

FIGS. 2A and 2B illustrate properties of Hadamard codes, which may be used in the disclosed embodiments. As discussed, spectral phase encoding involves changing the relative phases of frequency lines in an optical pulse in accordance with a set of codes. For the optical pulses produced by a phase-locked mode-locked laser (MLL), at the peak of the pulse intensity all of the frequency lines are in precise phase alignment (zero relative phase difference). The spectrum of the MLL may be composed of N phase-locked continuous lines. The lines may be situated on integer multiples of frequency spacing. This may give rise to a train of optical pulses at a repetition rate corresponding to the frequency spacing. The codes selectively determine, for the frequency lines, whether to change their phase, and if so, by how much. Some of the codes change relative phases of the frequency lines and some codes may not change any of the relative phases. Different codes can be used for spectral phase encoding, the different codes indicating different frequency lines to be phase shifted and by different amounts.

Hadamard codes are an example of these codes that are well known in the art. A set of Hadamard codes encompasses a closed orthogonal set. A closed orthogonal set is one such that a particular operation or combination among any two members of the set yields a third member of the set, and not a member outside the set. For example, a combination of any two Hadamard codes of a closed set results in a third Hadamard code that is within the same set. Hadamard codes are also orthogonal, which means that when a Hadamard code is combined with itself (or more generally, the complex conjugate of itself), it results in setting all of its relative phase shifts to 0 (effectively a unity operation). And, when a Hadamard code is combined with a different Hadamard code, the relative phase shifts are such that the optical intensity is zero at the time at which the original optical pulse intensity would have been at its peak. In other words, different Hadamard codes do not interfere with each other.

Although in a preferred embodiment a closed set of codes is used, it may be possible to use a "unique" set of codes that has no repeating codes in the code set that may be either closed or non-closed.

A spectral phase encoder may encode an optical pulse with a first Hadamard code. The encoded optical pulse may then pass through a different spectral phase encoder and perform additional encoding with a second Hadamard code from the same closed set. The resulting outputted coded optical pulse is encoded according to a combination of the first Hadamard code and the second Hadamard code, which is a third Hadamard code in the same set. FIGS. 2A and 2B illustrate this property.

FIG. 2A illustrates a table 200 of a closed set of Hadamard codes of order N=4. Table 200 would also apply to the first four Hadamard codes of a set of Hadamard codes of order higher than N=4. Column 202 represents possible first Hadamard encoders used to encode an optical pulse, ranging from H1-H4. Row 204 represents possible second Hadamard encoders used to further encode the optical pulse, also ranging from H1-H4. Matrix 206 represents all combinations of an optical pulse encoded with both a first Hadamard code and a second Hadamard code. Matrix 206 ranges from H1-H4, the same range as both the first Hadamard codes and the second Hadamard codes. Thus, the result of a combination of any two Hadamard codes in the set H1-H4 stays in the set H1-H4. Another property is that a Hadamard code combined with itself yields the code H1 which is the unity operator (introduces no relative phase shifts). Moreover, if a first code combined with a second code yields a third code, then the third code can be combined with the second code to yield the first code. For example, from table 200, H2 combined with H3 yields H4, and H4 combined with H3 yields H2 again. This property is useful for encoding and decoding signals with Hadamard codes, as will be discussed later.

In disclosed embodiments, column 202 is associated with the data word to be sent and row 204 is associated with the random key used to encrypt the data word. Any of the four codes from matrix 206 that are ultimately sent is equally likely to be associated with any of the four data words. Thus, if code H2 is sent, there is an equal likelihood of it corresponding to H1, H2, H3 or H4 (depending on the random key word).

FIG. 2B illustrates table 208, which shows Hadamard codes H1-H4 written as their Walsh decompositions (i.e., products of the Walsh functions W1 and W2), with H1=00, H2=01, H3=10, and H4=11 where the left digit indicates the presence or absence of W2 in the product and the right digit indicates the presence or absence of W1 in the product. Similar tables can be constructed for higher-order Hadamard codes. Thus, H4 is formed of the product of both W1 and W2. Table 208 may be one way of associating each of Hadamard codes H1-H4 with a binary number to further illustrate properties of the Hadamard codes. The binary numbers associated with Hadamard codes are not necessarily limited to their Walsh decompositions. Indeed, in the disclosed embodiments, the binary numbers associated with Hadamard codes may be arbitrary.

It can be seen from table 208 that combinations of Hadamard codes of a set can be viewed as a bit-by-bit XOR of their corresponding bits. For example, in FIG. 2A as discussed, encoding an optical pulse with H2 and H3 yields an optical pulse encoded with H4. Analogously, in FIG. 2B, a value of 01 (mapping to H2) XORed with a value of 10 (mapping to H3) yields a value of 11 (mapping to H4). Moreover, by performing an XOR on the resulting value 11 (H4) with 10 (H3) results in the original value 01 (H2). Thus, encoding an optical signal with two Hadamard codes has the effect of performing a bit-by-bit XOR operation on data words and key words that map to the Hadamard codes.

In this example, four possible Hadamard codes (i.e., H1-H4) map to two data bits and two random key bits. More generally, in disclosed embodiments, the data word and the key word may each include $\log_2(N)$ number of bits, where N is the number of unique orthogonal codes, such as Hadamard codes. For Hadamard codes, N is a power of 2.

In the Princeton University system illustrated in FIG. 1, a single encoded optical pulse carried on an optical pulse represents only a single bit of data. But it may be beneficial for a code to represent more than one bit. A "data word" is a grouping of bits of any number. It may be beneficial for a code to represent a data word of two or more bits to increase throughput, so that a code represents multiple bits. This may be implemented using a closed set of orthogonal codes, such as Hadamard codes.

Figure 3:
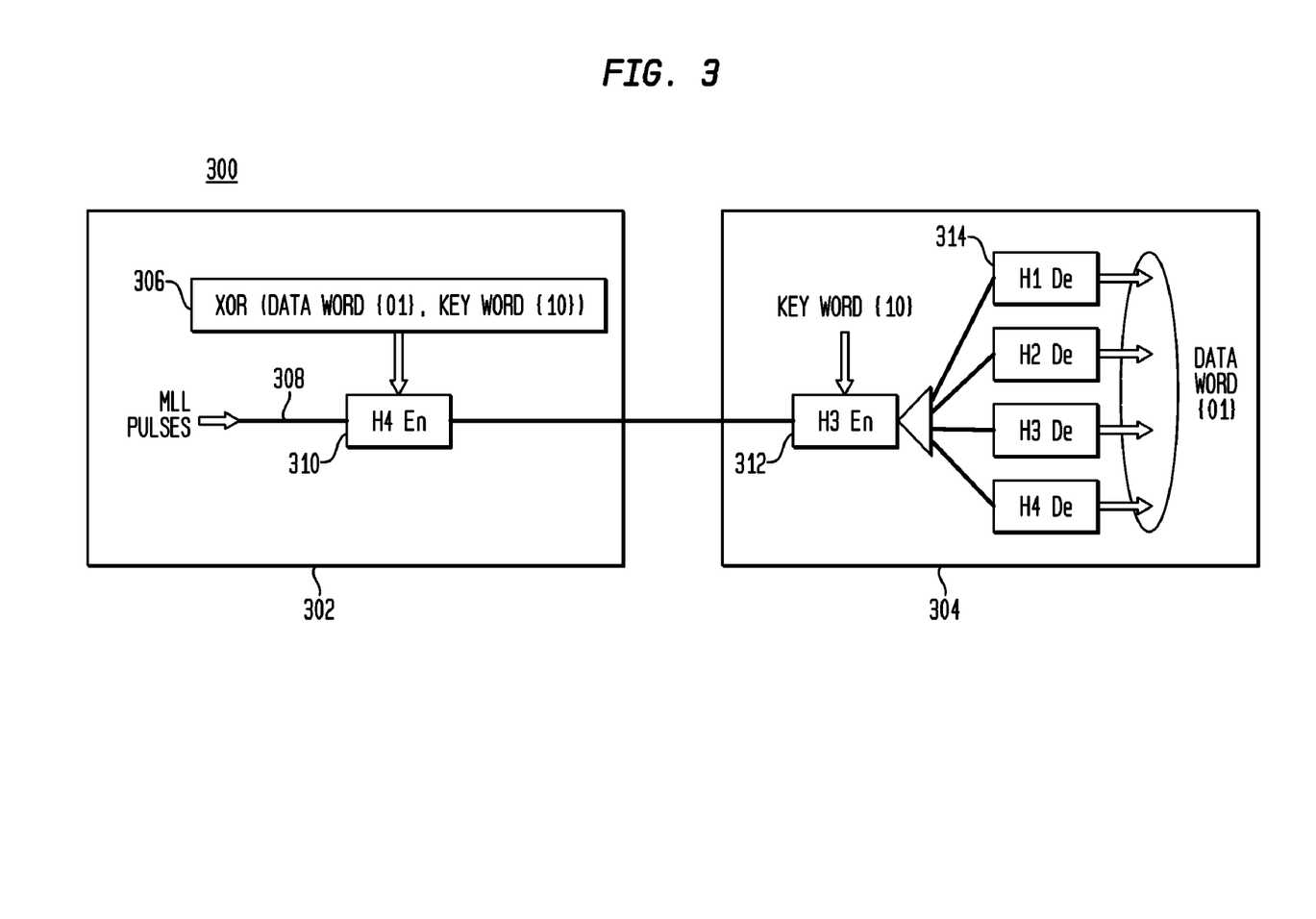
FIG. 3 illustrates a system for securely transmitting a data word as a Hadamard code using electronic XOR-ing of the data word and random key word to drive a fast dynamic encoder.

FIG. 3 illustrates a system 300 for securely transmitting a data word as a Hadamard code using an electronic XOR followed by a fast dynamic encoder (one capable of changing its encoding state on the time scale of a single optical pulse).

For the purposes of explanation, FIG. 3 (as well as the subsequent Figures) uses a closed Hadamard set of order 4 (i.e., H1-H4). However, any set of codes that are, for example, unique from each other and orthogonal to each other may be used.

FIG. 3 includes a transmitter 302 for transmitting an encrypted data word of two or more bits and a receiver 304 for receiving the encrypted data word of two or more bits from the transmitter 302. Transmitter 302 and/or receiver 304 may include fast dynamic spectral phase encoder(s) that can rapidly encode an optical pulse with any number of codes, such as Hadamard codes.

For the purposes of example, it is assumed that a data word for transmission and a random key word for encryption each have a length of two bits. A set of Hadamard codes of order 4 (e.g., H1-H4) may be used to represent any of the four combinations of the two bits. Moreover, H1-H4 may be mapped to bit combinations according to their Walsh decompositions, as illustrated in FIGS. 2A and 2B. It is further assumed in this example that the data word=01 and the key word=10. The number of bits and values are exemplary only.

Transmitter 302 may include component 306, which may be a computing unit, such as a processor or dedicated semiconductor component, that electronically calculates an XOR between data word 01 and random key word 10. The result of the XOR is 11. The value 11 may map to Hadamard code H4, according to the mapping in FIGS. 2A and 2B.

Transmitter 302 further includes optical pulses 308 from a mode-locked laser (MLL) and encoder 310. Encoder 310 receives optical pulses 308 and encodes one with code H4 on the basis of the XOR operation at component 306. Transmitter 302 sends the optical pulse encoded by H4 to receiver 304.

Receiver 304 includes encoder 312, which may receive the optical pulse encoded by H4. Encoder 312 further encodes the received optical pulse 308 with a Hadamard code selected according to the shared secret key word 10. Using the mapping from FIGS. 2A and 2B, bits 10 correspond to H3. Thus, optical pulse 308 encoded by H4 is further encoded by H3. Using the mapping from FIG. 2A, an optical pulse encoded with both H4 and H3 yields an optical pulse encoded by H2. H2 corresponds to bits 01, which is the originally encoded data bit.

In order to determine that the output of encoder 312 is H2, receiver 304 includes a bank of decoders 314. Decoders 314 may be spectral phase decoders, such as Hadamard decoders. Decoders 314 may include separate decoders for H1-H4. The decoder for H2 outputs a positive signal if its input is also H2, and outputs a null for all other inputs. The decoders for H1, H3, and H4 operate similarly. Thus, encoder 312 outputs an optical pulse encoded with H2. This optical pulse goes through decoders H1, H3, and H4, which yield a null output, and decoder H2, which yields a positive output. Because only decoder H2 yields a positive result, the optical pulse is deemed to be encoded with H2. H2 can then be mapped to data word 01 using a known mapping. In this way, system 300 encrypts data bits 01 with key word 10 at transmitter 302 and decrypts data bits 01 with key word 10 at receiver 304.

If the bank of decoders are Hadamard decoders, N decoders will be required (where N is the number of possible different codes sent by the transmitter). Alternatively, the decoders may be Composite Phase Masks (CPMs) instead of Hadamard decoders 314 and only $\log_2(N)$ of such CPM decoders will suffice. CPMs are disclosed in the paper "Direct Optical Processing of M-ary Code-Shift Keyed OCDMA using Integrated Passive Optical Phase Decoders," by Menendez et al., the contents of which are hereby incorporated by reference. Composite phase masks directly output the actual bit from the encoded optical pulse, and may include one composite phase mask per bit. Thus, while using decoders 314 may require four separate Hadamard decoders, using composite phase masks may only require two separate composite phase masks.

In FIG. 3, the bit-by-bit XOR operation between data word 01 and key word 10 is performed electronically. In some disclosed embodiments, this operation may be performed optically.

Figure 4:
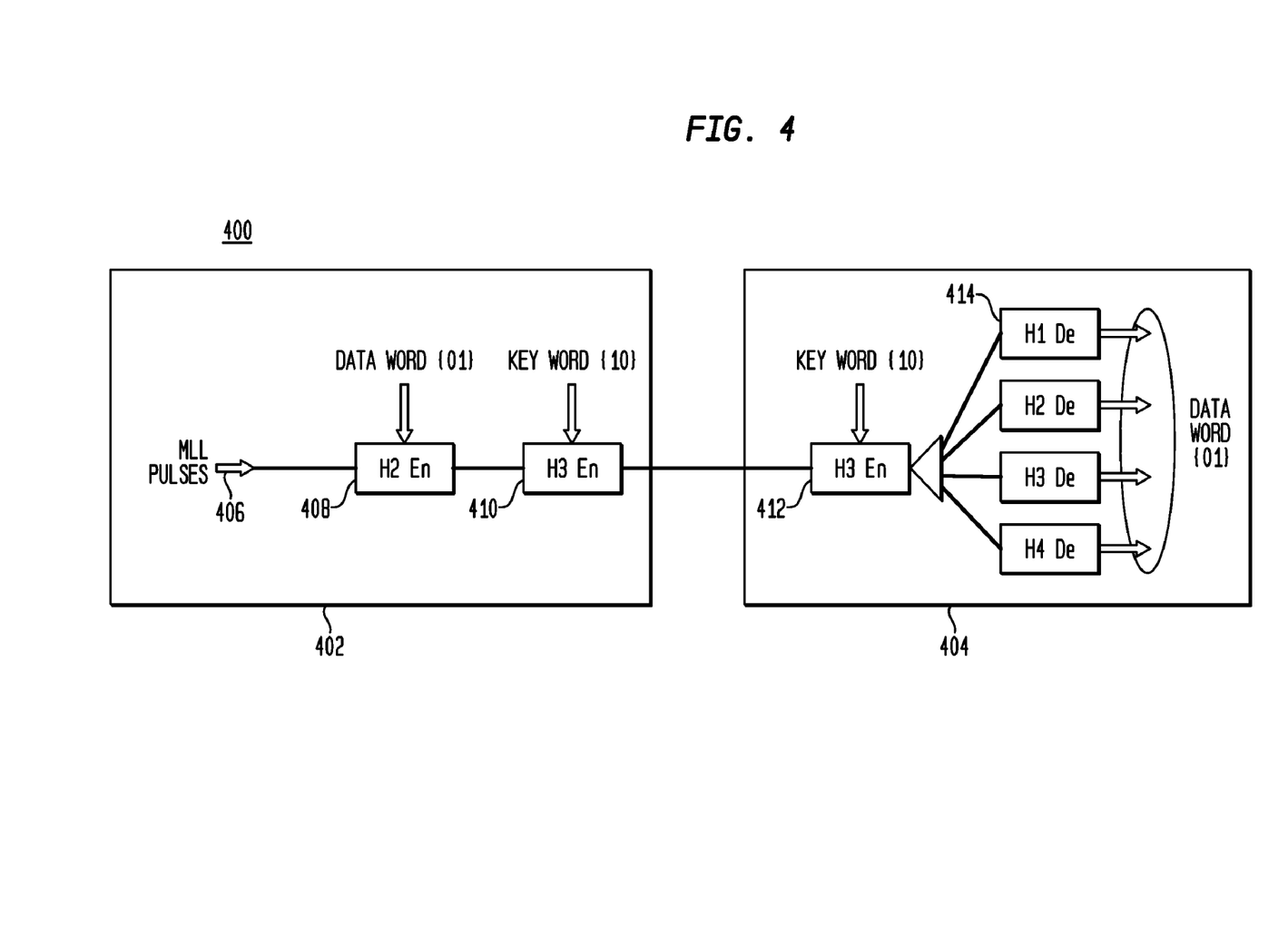
FIG. 4 illustrates a system for securely transmitting a data word as a Hadamard code using a pair of dedicated dynamic encoders and the optical XOR property of Hadamard codes.

FIG. 4 illustrates a system 400 for securely transmitting a data word as a Hadamard code using an optical XOR. FIG. 4 includes a transmitter 402 for transmitting an encrypted data word of two or more bits and a receiver 404 for receiving the encrypted data word of two or more bits from transmitter 402. Transmitter 402 and/or receiver 404 may include fast dynamic spectral phase encoder(s) that can rapidly encode an optical pulse with any number of codes, such as Hadamard codes.

Transmitter 402 receives MLL optical pulses 406 at encoder 408. Encoder 408 selects code H2 based on data word 01 and spectrally phase encodes the optical pulse with H2. Encoder 410 receives the optical pulse encoded with H2. Encoder 410 selects code H3 based on key word 10 and further encodes the optical pulse encoded by H2 with H3. Encoder 410 outputs an optical pulse encoded by H2 and H3, in other words, an optical pulse encoded by H4 (which is the combination of H2 and H3, as shown in FIG. 2A). This encoding with H2 (corresponding to 01) and H3 (corresponding to 10) to yield H4 (corresponding to 11) is an optical XOR that replaces the electronic XOR performed by component 306 in FIG. 3. Indeed, both transmitter 302 from FIG. 3 and transmitter 402 from FIG. 4 output an optical pulse encoded with H4, using data word 01 and key word 10.

Transmitter 402 sends the optical pulse encoded with H4 to receiver 404. Receiver 404 includes encoder 412 and decoders 414, which are similar to encoder 312 and decoders 314 from FIG. 3. Moreover, receiver 404 in FIG. 4 may perform the same function as receiver 304 in FIG. 3, and will not be discussed further.

In some cases, fast dynamic spectral phase encoders may not be available. Accordingly, the disclosed embodiments may be implemented using a cascade of static spectral phase encoders with fast optical switches. The static spectral phase encoders may only be able to phase encode with a single code, for example, a single Hadamard code.

Figure 5:
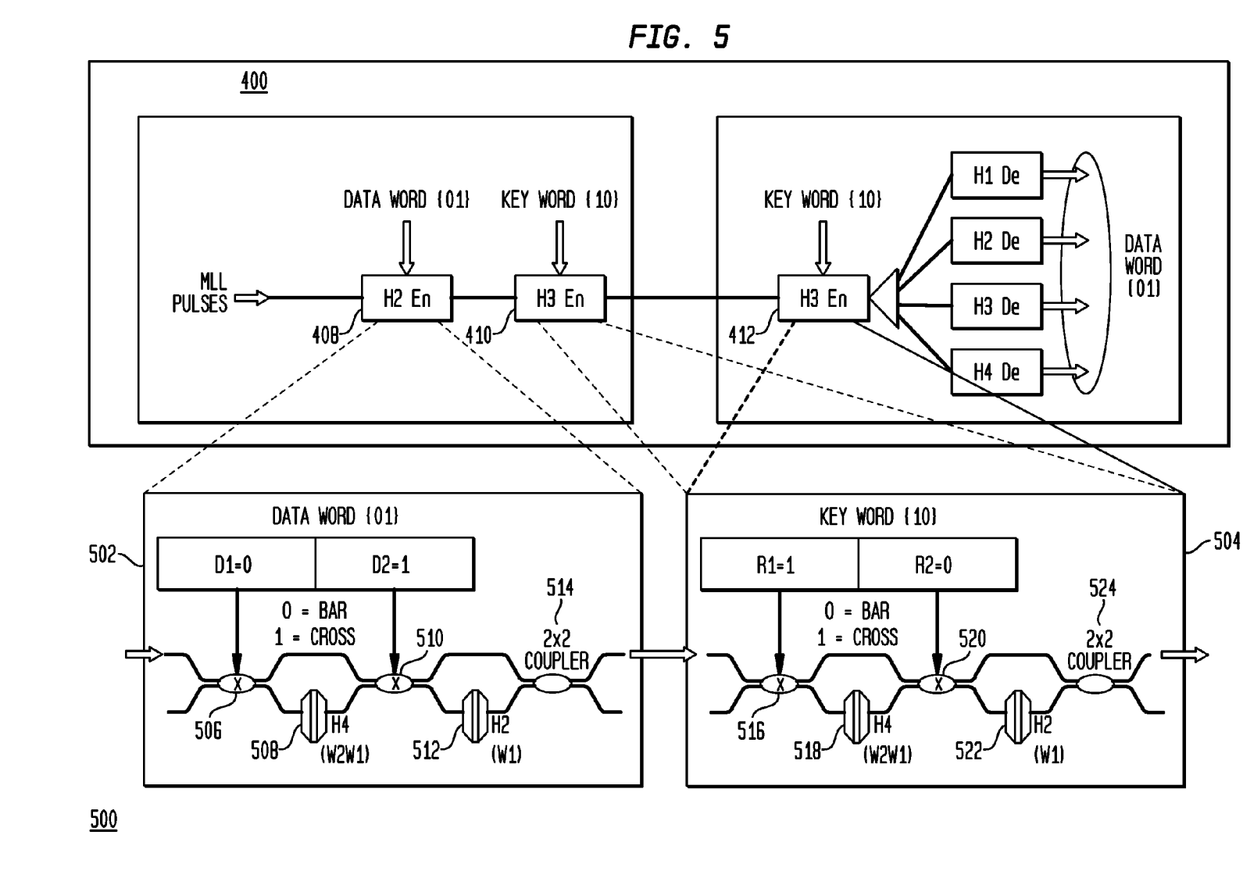
FIG. 5 illustrates a system for securely transmitting a data word as a Hadamard code using a pair of dedicated encoders, each based on a cascade of static Hadamard encoders and fast optical switches.

FIG. 5 illustrates a system 500 for securely transmitting a data word as a Hadamard code using dedicated Hadamard coders. Each dedicated Hadamard coder may be configured to encode a static Hadamard code. The components from system 500 map to the components from system 400, which are also shown in FIG. 5.

In particular, optical encoding device 502 performs the function of encoder 408 from system 400, and optical encoding device 504 performs the function of encoders 410 and 412 from system 400.

Optical encoding device 502 includes a 2×2 switch 506 that receives MLL pulses on its upper input. In this example, the lower input of switch 506 may have no signal and is ignored. Switch 506 is controlled by first data bit 0 of data word 01 to enter into a bar state. Therefore, switch 506 switches its upper input to its upper output, bypassing encoder 508. Encoder 508 may be a dedicated Hadamard encoder for code H4. But the output of switch 506 reaches 2×2 switch 510 without passing through encoder 508. Switch 510 is controlled by a second data bit 1 of data word 01 to enter into a cross state. Therefore, switch 510 switches its upper input to its lower output towards encoder 512. Encoder 512 may be a dedicated Hadamard encoder for code H2. Encoder 512 encodes the lower output of switch 510 with H2 and outputs the encoded pulse to 2×2 coupler 514. Coupler 514 combines its lower input with the encoded optical pulse with its upper input of no signal, and outputs the combination on both outputs. The lower output of coupler 514 is ignored, and the upper output is transmitted to optical encoding device 504.

Encoder 504 includes 2×2 switch 516, which receives the optical pulse encoded with H2 on its upper input. For this example, the lower input is ignored. Switch 516 is controlled by first key bit 1 of key word 10 to enter into a cross state. Therefore, switch 516 switches its upper input to its lower output toward encoder 518. Encoder 518, similar to encoder 508, may be a dedicated Hadamard encoder for code H4. Encoder 518 encodes the optical pulse encoded with H2 further with H4, and outputs an optical pulse encoded by the product H2 and H4. In other words, encoder 518 outputs an optical pulse encoded with H3 (a combination of H2 and H4). Encoder 518 outputs this optical pulse to switch 520. Switch 520 is controlled by a second key bit 0 of key word 10 to enter into a bar state. Therefore, switch 520 switches its lower input to its lower output towards encoder 522. Encoder 522, similar to encoder 512, may be a dedicated Hadamard encoder for code H2. Encoder 522 encodes the optical pulse encoded with H3 further with H2, and outputs an optical pulse encoded by the product of H3 and H2. In other words, encoder 522 outputs an optical pulse encoded with H4 (a combination of H3 and H2). This optical pulse is sent to a receiver by coupler 524, which may operate similar to coupler 514. The receiver may include optical encoding device 504 to undo the effect of key word 10. The receiver may then determine the data word in a similar manner, as illustrated in FIGS. 3 and 4.

A drawback to the system in FIG. 5 is that the transmitter may encode an optical pulse with the same code in several different ways. For example, in FIG. 5, the transmitter could output an optical pulse encoded with H4 by encoding the pulse in the following ways: through only encoder 508; through only encoder 518; through only encoders 508, 512, and 522, etc. Moreover, different combinations of encoders leave different signatures on an encoded optical pulse. In this example, even though the transmitter outputs H4, there are different ways of obtaining H4, and each way may leave a different signature in the encoded pulse that carries H4. An intercepting user may be able to analyze these signatures to determine the makeup of optical encoding devices 502 and 504. This would compromise the security of system 500.

Figure 6:
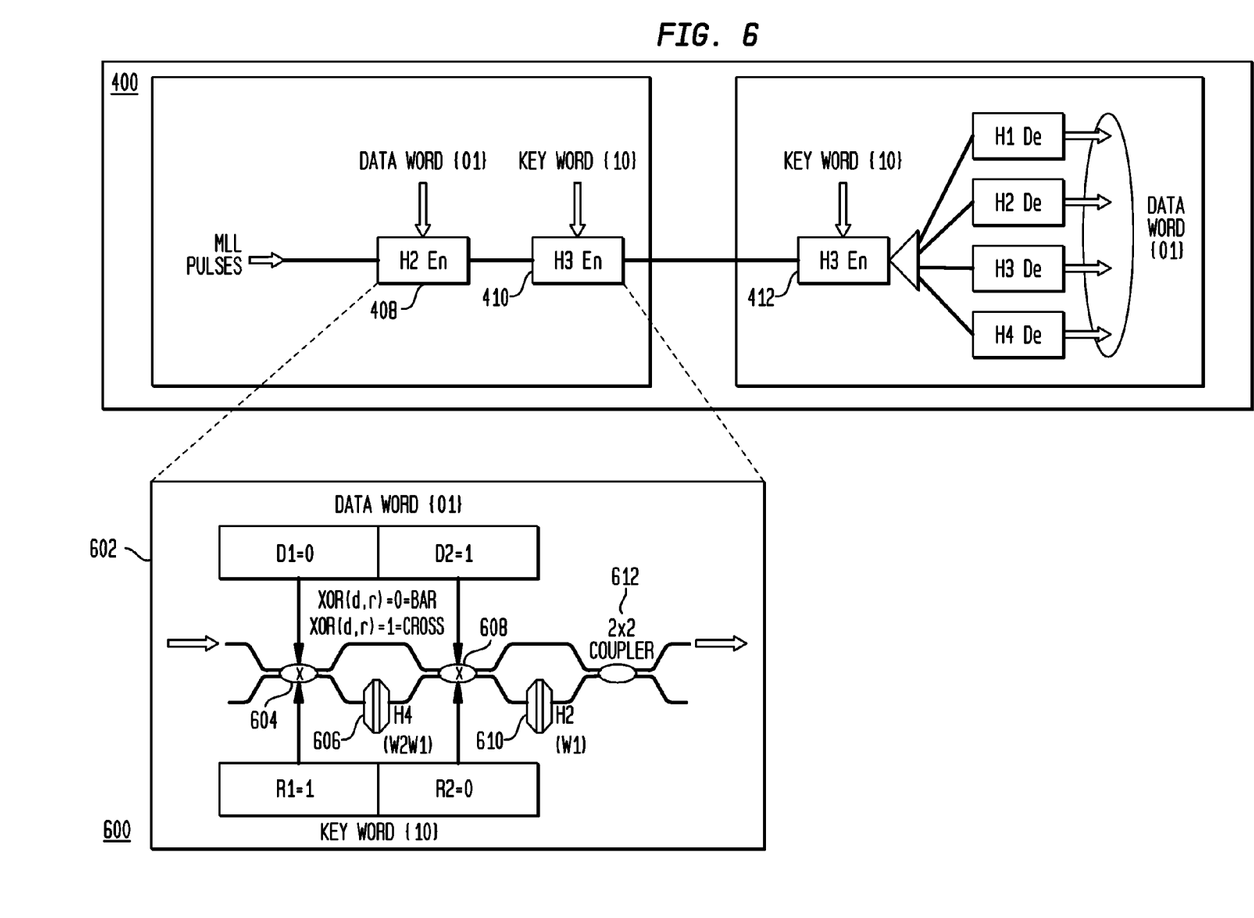
FIG. 6 includes a system that allows an optical code to be selected using a pair of dedicated encoders, collectively including a pair of static Hadamard encoders and fast optical switches.

FIG. 6 includes a system 600 that allows an optical code to be selected using only a single combination of encoders. This may reduce any ability for an intercepting party to analyze signatures in a transmitter output. The components from system 600 map to the components from system 400, which are also shown in FIG. 6.

In particular, optical encoding device 602 performs the functions of encoders 408 and 410 from system 400. Optical encoding device 602 may include 2×2 switches that are controlled by two input bits. The switches may enter into a bar state if the XOR between the bits results in a 0 (e.g., 0 XOR 0, 1 XOR 1), and may enter into a cross state if the XOR between the bits results in a 1 (e.g., 1 XOR 0, 0 XOR 1).

In particular, optical encoding device 602 includes a 2×2 switch 604 that receives MLL pulses on its upper input. In this example, the lower input of switch 604 may have no signal and is ignored. Switch 604 is controlled by a first data bit 0 (of data word 01) and a first key bit 1 (of key word 10), the XOR of which results in a 1. Thus, switch 604 enters into a cross state. Switch 604 switches its upper input to its lower output towards encoder 606. Encoder 606 may be a dedicated Hadamard encoder for code H4. Encoder 606 may receive the lower output from switch 604 as an optical pulse and encode the optical pulse with code H4. Encoder 606 may output the encoded optical pulse to switch 608.

Switch 608 is controlled by a second data bit 1 (of data word 01) and a second data bit 0 (of key word 10), the XOR of which results in a 1. Thus, switch 608 enters into a cross state. Switch 608 switches its lower input to its upper output, in this case, causing the optical signal to bypass encoder 610. Encoder 610 may be a dedicated Hadamard encoder for code H2. Coupler 612 receives the optical pulse encoded with H4 on its upper input and combines it with its lower input of no signal, and outputs the combination on both outputs to a receiver. The receiver may include an encoder, similar to optical encoding device 504 from FIG. 5, and may decode the optical pulse encoded with H4 in a similar manner as in FIGS. 3-5. Note that the encoder 412 is driven only by the shared key word.

In a disclosed embodiment, the systems of FIGS. 5 and 6 may be built with 2×1 switches instead of 2×2 switches. This can be implemented using a 2×1 coupler before the second cascaded switch. For example, in FIG. 6, switches 604 and 608 may be replaced by 2×1 optical switches, and a 2×1 coupler may be inserted before switch 608 to ensure that it receives only a single input. However, 2×1 switches may be lossier than 2×2 switches.

It may be possible to send two data words on the same pulse. For example, two different sets of orthogonal codes may be identified. The codes within each of the sets may be unique from all other codes in the set, and from all codes in the other set. The sets may be closed sets. Different data words may be encoded with the different data sets and sent on the same optical pulse.

As discussed, the examples shown in FIGS. 5 and 6 use the closed set of Hadamard codes H1-H4. But disclosed embodiments are not limited to closed sets, and can also include open sets, so long as a transmitted code is equally likely to correspond any data word without knowledge of a random key word used for encryption.

One way of implementing a non-closed set is to modify the encoders in FIGS. 5 and 6 by adding a third static spectral phase encoder. The third code implemented by the third static spectral phase decoder is chosen from codes not already produced by the unmodified encoder.

For example, the open set of Hadamard codes H5-H8 may be used in FIGS. 5 and 6, by adding an H5 spectral phase encoder. The codes H5-H8 are an open set (i.e., non-closed) because a combination of two codes within a set can yield a code outside the set (e.g., H5*H6 yields H2). Code H5 is not implemented by any of the static spectral phase encoders in FIGS. 5 and 6. In encoder 502, the H5 encoder may be placed on the upper input of switch 506 in FIG. 5 or on the upper output of coupler 514. Or the H5 encoder may be placed on the upper input of switch 510 and spectral phase encoder 508 is changed to a H4*H5 encoder (i.e., H8). Alternatively, the H5 encoder may be placed on the upper input of coupler 514 and spectral phase encoder 512 is changed to a H2*H5 encoder (i.e., H6). Similar modification may be made to encoder 504 in FIG. 5 and encoder 602 from FIG. 6.

The use of H5-H8 as an open set is exemplary only. Other open (non-closed) sets can be used, such as {H1, H3, H5, H7} and {H2, H4, H6, H8}. Moreover, there are many other schemes of using non-closed sets that may be used in disclosed embodiments, and the examples above are for illustrative purposes only. There can also be more than two groups of sets. For example, the closed set Hadamard 16 can be divided into 2 groups of 8 codes or 4 groups of 4 codes.

Figure 7:
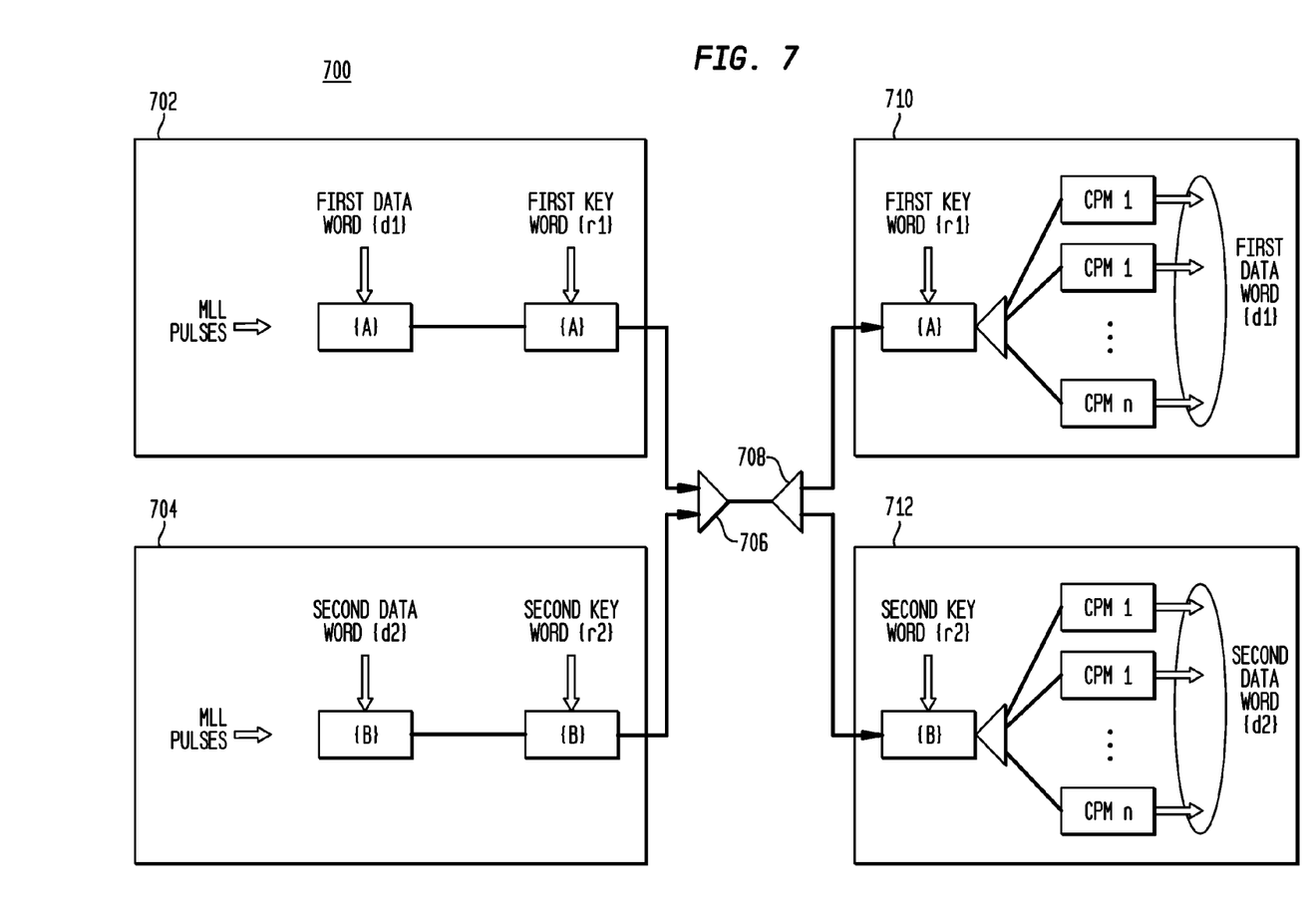
FIG. 7 illustrates a system for transmitting multiple encrypted data words on the same pulse using unique code sets.

FIG. 7 illustrates a system 700 for simultaneously transmitting multiple encrypted data words on the same pulse using unique disjoint code sets. FIG. 7 includes transmitters 702 and 704. Transmitter 702 selects a code from code set A, according to a first data word d1 and a first key word r1, and may code a first signal. Transmitter 704 selects a code from code set B, according to a second data word d2 and a second key word r2, and codes a second signal. The first and second signal may be optical signals and may the same or different. In some embodiments, the first and second signal may be copies of each other. First and second key words r1 and r2 may be independent. Moreover, code sets A and B may be unique and different from each other. In other words, code sets A and B do not share any codes. Moreover in a preferred embodiment, all of the codes in code sets A and B are orthogonal with each other.

Transmitters 702 and 704 each output a differently coded optical pulse and may send them to a 2×1 coupler 706 to bit-synchronously combine them. Coupler 706 may send the combined pulses over a single optical fiber. The separate codes may obscure each other and make it more difficult for an intercepting party to determine the codes being sent. This may add another layer of security.

The optical pulse over the single fiber may be split at the receiving end by a 1×2 splitter 708. One of the signals may be sent to receiver 710 and the other to receiver 712. Receivers 710 and 712 may receive the identical or substantially similar combined signal. Receivers 710 and 712 may decode their respective signals. In particular, receiver 710 may seek to recover first data word d1 by selecting a code from code set A according to first key word r1. Even though receiver 710 receives an optical pulse encoded with two codes, one from code set A and one from code set B, receiver 710 is still able to recover the code from code set A intended for it. This is because the codes from code set B do not interfere with the codes from code set A, due to their orthogonality.

Similarly, receiver 712 may seek to recover second data word d2 by selecting a code from code set B according to second key word r2. Even though receiver 712 receives an optical pulse encoded with two codes, one from code set A and one from code set B, receiver 712 is still able to recover the code from code set B intended for it. This is because the codes from code set A do not interfere with the codes from code set B, due to their orthogonality. Receivers 710 and 712 may use banks of either decoders or composite phase masks to determine their respective data word.

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method for transmitting an encrypted data word of two or more bits, the method comprising the steps of:
    identifying a random key word comprising two or more bits for encrypting the data word;
    identifying a set of unique orthogonal codes;
    selecting a code from the set of unique orthogonal codes that corresponds to a result of an optically performed exclusive-or (XOR) operation between the two or more bits of the data word and the random key word with at least two optical switches and at least two spectral phase encoders that each encode a different static Hadamard code;
    encoding a signal with the code; and
    transmitting the encoded signal as encrypted data.

2. The method of claim 1, wherein the set of unique orthogonal codes comprises a number N of Hadamard codes.

3. The method of claim 2, wherein the bits of the data word and the bits of the random key word each include $\log_2(N)$ number of bits.

4. The method of claim 1, wherein:
    the signal is an optical signal; and
    the step of encoding the signal further comprises the step of encoding the optical signal with the code at an optical encoding device, the optical encoding device including the at least two spectral phase encoders.

5. The method of claim 4, wherein the step of encoding the signal further comprises the step of:
    changing, with the at least two spectral phase encoders, phases of the frequency lines of the optical signal in accordance with the code.

6. The method of claim 4, wherein the optical encoding device includes the at least two optical switches, and wherein the step of encoding the signal further comprises the steps of:
    receiving, at a one of the at least two optical switches, the optical signal;
    receiving, at the one optical switch, at least one of the bits of the data word or one of the bits of the random key word to control switching of the optical signal; and
    switching the optical signal to one of the at least two spectral phase encoders to encode the optical signal with the code.

7. The method of claim 1, wherein the data word is a first data word, the random key word is a first random key word, the set of unique orthogonal codes is a first set of unique orthogonal codes, the signal is a first signal, and the code is a first code, the method further comprising the step of:
    selecting a second code from a second set of unique orthogonal codes, unique from the first set of unique orthogonal codes, the second code corresponding to a result of an exclusive-or (XOR) operation between bits of a second data word and bits of a second random key word; and
    wherein the step of encoding a signal further comprises the step of encoding the first signal with the first code and a second signal with the second code, for a combined first signal and second signal to carry both the first data word and the second data word, and to obscure the first code and the second code.

8. The method of claim 1, wherein the set of unique orthogonal codes is a closed set.

9. A method for receiving an encrypted data word of two or more bits from a transmitter, the method comprising the steps of:
    identifying a set of unique orthogonal codes;
    identifying a random key word comprising two or more bits for decrypting a data word;
    receiving a signal encoded by a first code of the set of unique orthogonal codes that corresponds to a result of an exclusive-or (XOR) operation between the two or more bits of the data word and the random key word;
    selecting a second code, from the set of unique orthogonal codes, on the basis of the two or more bits of the random key word, the second code corresponding to the two or more bits of the data word; and decrypting the signal encoded by the first code into a signal encoded by the second code at an optical encoding device, the optical encoding device including at least two spectral phase encoders;

wherein the optical encoding device includes at least two optical switches, and wherein the step of decrypting the signal further comprises the steps of:

receiving, at one of the at least two optical switches, the optical signal encoded by the first code and at least one bit of the random key word to control switching of the one optical switch; and switching the optical signal encoded by the first code with the one optical switch to one of the at least two spectral phase encoders.

10. The method of claim 9, wherein the set of unique orthogonal codes comprises a number N of Hadamard codes.

11. The method of claim 10, wherein the bits of the data word and the bits of the random key word each include $\log_2(N)$ number of bits.

12. The method of claim 9, wherein the step of decrypting the signal further comprises:

receiving, at the one spectral phase encoder, the optical signal encoded by the first code;

changing phases of the frequency lines of the optical signal encoded by the first code, in accordance with a code of the one spectral phase encoder; and outputting, at the one spectral phase encoder, the optical signal encoded by the second code.

13. The method of claim 9, further comprising the step of:

receiving the signal encoded by the second code at composite phase masks, each of the composite phase masks associated with a bit of the data word; and outputting, at the composite phase masks, the bits of the data word.

14. The method of claim 9, further comprises the steps of:

receiving the signal encoded by the second code at Hadamard decoders, each of the Hadamard decoders associated with a different code from the closed set of predefined orthogonal codes;

receiving a first output from one of the Hadamard decoders and a second output from all remaining Hadamard decoders;

determining that the signal is encoded by the second code by identifying the Hadamard decoder with the first output; and determining the data word by mapping the second code to the data word.

15. The method of claim 9, wherein the set of unique orthogonal codes is a closed set.

16. A system with a transmitter and a receiver for communicating an encrypted data word of two or more bits, wherein:

the transmitter is configured to:

identify a random key word comprising two or more bits for encrypting the data word;

identify a set of unique orthogonal codes;

select a first code from the set of unique orthogonal codes that corresponds to a result of an exclusive-or (XOR) operation between the two or more bits of the data word and the random key word;

encode a signal with the first code; and transmit the encoded signal as encrypted data; and the receiver is configured to:

receive the signal encoded by the first code; and select a second code, from the set of unique orthogonal codes, on the basis of the two or more bits of the random key word, the second code corresponding to the two or more bits of the data word;

wherein the transmitter comprises at least two optical switches and at least two spectral phase encoders collectively configured to:

optically perform the XOR operation to select the first code, wherein the spectral phase encoders each encode a different static Hadamard code.

17. The system of claim 16, wherein the set of unique orthogonal codes comprises a number N of Hadamard codes.

18. The system of claim 17, wherein the bits of the data word and the bits of the random key word each include $\log_2(N)$ number of bits.

19. The system of claim 16, wherein the transmitter comprises an optical encoding device, with one of the at least two spectral phase encoders, configured to:

receive the signal as an optical signal; and encode the optical signal with the first code.

20. The system of claim 19, wherein the spectral phase encoder is configured to:

change phases of the frequency lines of the optical signal in accordance with to the first code.

21. The system of claim 19, the optical encoding device further including the at least two optical switches, one of the at least two optical switches configured to:

receive the optical signal;

receive at least one of the bits of the data word or one of the bits of the random key word to control switching of the optical signal; and switch the optical signal to the one of the at least two spectral phase encoders to encode the optical signal with the first code.

22. The system of claim 16, wherein the receiver comprises an optical encoding device, including the at least two spectral phase encoders, configured to:

receive the signal as an optical signal; and decrypt the optical signal encoded by the first code into a signal encoded by the second code.

23. The system of claim 22, wherein the at least two spectral phase encoders is configured to:

receive the optical signal encoded by the first code;

change phases of the frequency lines of the optical signal encoded by the first code, according to a code of one of the at least two spectral phase encoders; and output the optical signal encoded by the second code.

24. The system of claim 22, the optical encoding device further comprising the at least two optical switches, one of the at least two optical switches configured to:

receive the optical signal encoded by the first code and at least one bit from the random key word to control switching of the one optical signal; and switch the optical signal encoded by the first code to one of the at least two spectral phase encoders.

25. The system of claim 16, wherein the receiver comprises composite phase masks each associated with a bit of the data word, the composite phase masks configured to:

receive the signal encoded by the second code; and outputting the bits of the data word.

26. The system of claim 16, wherein the receiver comprises Hadamard decoders configured to:

receive the signal encoded by the second code; and output a first output from one of the Hadamard decoders and a second output from all remaining Hadamard decoders, wherein the receiver is further configured to determine the second code by identifying the Hadamard decoder with the first output, and determine the data word by mapping the second code to the data word.

27. The system of claim 16, wherein the data word is a first data word, the random key word is a first random key word, the set of unique orthogonal codes is a first set of unique orthogonal codes, the signal is a first signal, and the code is a first code, wherein the transmitter is further configured to:
select a second code from a second set of unique orthogonal codes, unique from the first closed set of predefined orthogonal codes, the second code corresponding to a result of an exclusive-or (XOR) operation between bits of a second data word and bits of a second random key word; and encode the first signal with the first code and the second signal with the second code, for a combined first signal and second signal to carry both the first data word and the second data word.

28. The system of claim 16, wherein the set of unique orthogonal codes is a closed set.

* * * * *

UNITED STATES PATENT AND TRADEMARK OFFICE
CERTIFICATE OF CORRECTION

| | | |
|---|---|---|
| PATENT NO. | : 8,406,423 B2 | Page 1 of 1 |
| APPLICATION NO. | : 12/724617 | |
| DATED | : March 26, 2013 | |
| INVENTOR(S) | : Menendez | |

It is certified that error appears in the above-identified patent and that said Letters Patent is hereby corrected as shown below:

In the Specification

In Column 4, Line 24, delete "illustrate" and insert -- illustrates --, therefor.

In Column 4, Line 49, delete "DESCRIPTION" and insert -- DETAILED DESCRIPTION --, therefor.

In the Claims

In Column 14, Line 25, in Claim 20, delete "with to the" and insert -- with the --, therefor.

Signed and Sealed this
Eighteenth Day of November, 2014

Michelle K. Lee
*Deputy Director of the United States Patent and Trademark Office*